United States Patent [19]

Porter

[11] Patent Number: 5,467,920
[45] Date of Patent: Nov. 21, 1995

[54] THERMOSTAT WITH ADJUSTMENT FOR THE CYCLING RATE OF THE HEATING PLANT

[75] Inventor: Richard B. Porter, Bloomington, Minn.

[73] Assignee: Honeywell Inc., Minneapolis, Minn.

[21] Appl. No.: 261,369

[22] Filed: Jun. 16, 1994

[51] Int. Cl.$^6$ .................................................. G05D 23/00
[52] U.S. Cl. ............................................ 236/68 B; 236/10
[58] Field of Search ................................ 236/68 R, 68 B, 236/68 C, 10, 46 R, 46 F, 78 D; 62/202

[56] References Cited

U.S. PATENT DOCUMENTS

| | | | |
|---|---|---|---|
| 1,741,601 | 12/1929 | Appelberg | 236/68 B |
| 2,209,768 | 7/1940 | Dillman | 236/68 B X |
| 2,489,049 | 11/1949 | Root | 236/68 B X |
| 2,649,530 | 8/1953 | Dietz | 236/68 B X |
| 2,732,132 | 1/1956 | Hulett | 236/68 B X |
| 3,948,438 | 4/1976 | Vlasak . | |
| 4,485,966 | 12/1984 | Cartmell et al. . | |
| 4,489,882 | 12/1984 | Rogers . | |
| 4,759,498 | 7/1988 | Levine et al. . | |
| 4,817,705 | 4/1989 | Levine et al. . | |
| 4,901,918 | 2/1990 | Grald et al. . | |
| 5,002,226 | 3/1991 | Nelson . | |
| 5,039,010 | 8/1991 | Juntunen | 236/68 B X |
| 5,115,968 | 5/1992 | Grald . | |

*Primary Examiner*—Harry B. Tanner
*Attorney, Agent, or Firm*—Edward L. Schwarz

[57] ABSTRACT

An electromechanical thermostat has a fixed value voltage anticipator resistor and a variable anticipator resistor for series connection with the load. This allows a single thermostat to control either a high efficiency furnace requiring a relatively low cycle rate or a furnace of conventional efficiency which can function at a higher cycle rate. Preferably, the voltage anticipator resistor is selected to give the cycle rate required by high efficiency furnaces when the resistance of the variable anticipator resistor is set to zero ohms. If the thermostat is shipped with the variable resistor set to zero ohms, the installer will not have to adjust the variable resistor whenever the thermostat is installed in a system requiring that cycle rate.

11 Claims, 2 Drawing Sheets

THERMOSTAT WITH ADJUSTMENT FOR THE CYCLING RATE OF THE HEATING PLANT

BACKGROUND OF THE INVENTION

The emphasis in the past two or so decades on conserving energy has led to substantial improvements in the efficiency of more recently designed furnaces for controlling the air temperature in interior space. However, these high efficiency furnaces are more expensive, and sometimes this higher cost does not justify the energy conservation possible. Furthermore, the typical furnace is a relatively long-lived device. The result of these factors is that there is now a wide range of efficiencies in furnaces which are already installed or to be installed as new or replacement units.

There are two different types of heating systems using combustion of a fuel now in common use. The most common of these is the heated air system which uses a fan to force air heated by the furnace through ducts to the various rooms or areas of the structure. A less common type of heating system typically but not always found in older homes is the hydronic system which circulates water heated by the furnace through radiators located in the rooms or areas of the structure to be heated. Most of the discussion which follows will assume a heated air system, but the invention to be described below can be practiced in a hydronic system as well, although the operating parameters of the invention will be different. Within these two types of heating systems, there are further subtypes of which no further note be taken, other than to observe that the parameters used by the invention when installed in a heating system will again differ from one subtype to another.

As is almost too well known to requiring mentioning, furnace operation is controlled by a furnace control which sequences the various functions of the heating system so as to safely start, run, and stop the heating system. One or more thermostats installed within the structure whose interior space is to be heated, controls flow of current from a low voltage power supply such as a transformer or a DC converter to the furnace control. In the typical procedure, each time power is applied to the furnace control the heating system runs through its normal operating sequence to the run condition where heat is provided to the structure. When power is removed from the furnace control, the furnace then reenters its wait (standby) state.

Thermostats are typically of two types also, electronic and electromechanical. While electronic thermostats typically offer more features, they are also somewhat more expensive, and their more complicated user interface tends to confuse technically challenged individuals. Accordingly, there is still a substantial market for electromechanical thermostats. The invention pertains to electromechanical thermostats only.

In typical electromechanical thermostats, the angle relative to horizontal of a mercury switch is controlled by a bimetal coil. As is well known of course, the conductive state of the mercury switch is controlled by this angle. The inner end of the bimetal coil is mounted for rotation on an axle which can be placed at any of a variety of angular positions which defines the thermostat temperature setting. The mercury switch is mounted on the outer end of the bimetal coil, and as the temperature of the bimetal coil changes, the angle with respect to horizontal of the mercury switch also changes. Since the bimetal coil has very small mass compared to its surface area, the angle of the switch changes quite rapidly as temperature of the air surrounding the coil changes. When used to control a furnace, contacts within the mercury switch are bridged by the mercury globule within the mercury switch as the temperature of the bimetal coil falls. As the temperature of the bimetal coil rises in response to operation of the furnace, the change in the mercury switch angle causes the mercury globule to roll away from the contacts, and conduction between them ceases, shutting down the furnace.

The bimetal coil and switch of a typical thermostat have a switch differential of around 2° F., meaning that an increase of 2° F. in the air temperature adjacent to the bimetal coil after the switch closes is sufficient to cause the switch to open, and a decrease in this air temperature of 2° F. after the switch opens is sufficient to cause the switch to close. The switch differential is related to the so-called room differential, which is the swing in room temperature necessary to change the switch conduction state. One will realize that the room differential is dependent on a number of factors in addition to the switch differential. Among these is the amount of air circulation in the room and the size and location of vents in the thermostat housing itself. One should also realize that the air temperature within a room or area is not uniform. Furthermore, comfort of the occupants depends on a number of factors besides air temperature within the structure. Among these factors are humidity, wall temperature, window area and window treatments, outside air temperature.

One factor in operation of furnaces which is controlled at least partly by the thermostat is the cycle time, or the time between successive startups of the furnace. Cycle time is usually measured not in the actual time between successive startups but instead in terms of the number of startups or cycles per hour, abbreviated cph. Thus a cycle time of 20 minutes is the equivalent of 3 cph. It is preferred to have a lower cycle rate, typically 3 cph, for high efficiency furnaces for a variety of reasons. Chief among these is the fact that the combustion gasses ejected from a high efficiency furnace are cooled to a level which is very near to the condensing temperature of the water vapor in the combustion gasses. This causes moisture to condense in the chimney duct and flue during each startup of the furnace. If the cph value is high, the moisture can accumulate because the flue does not get a chance to thoroughly heat and evaporate any condensed moisture. Since these chimney ducts and flues at least partly comprise galvanized steel, accumulated moisture eventually causes rusting and even perforation of the duct. Perforation of the duct in particular is a serious situation since it may allow release of toxic combustion products within living spaces. Less efficient furnaces release combustion gasses at a higher temperature which tends to thoroughly heat and dry out the chimney duct even with a high cycle rate. It is therefore possible to run less efficient furnaces at higher cycle rates without harm to the flues and ducts. A common cycle rate for furnaces having conventional efficiencies is 5 cph. Other things being equal (which they not usually are), it is preferable to run at a higher cycle rate because the room differential is smaller for higher cycle rates. However, when using a high efficiency furnace, one can compensate for the larger room differential resulting from a lower cycle rate by simply increasing the temperature setting slightly for the thermostat.

Experience has shown that a thermostat comprising only the bimetal coil and switch tends to produce quite a large room differential because of the conduction and convection heat transfer delays between the furnace and the room air and between the room air and the air within the thermostat housing. That is, once the thermostat switch closes, several minutes at least elapse before the room air temperature starts to rise. And after the room air temperature has risen to the comfort level, the temperature within the thermostat housing will lag behind this temperature by several minutes. When the switch differential range has been traversed by the air temperature adjacent to the bimetal coil, the switch opens and the furnace shuts down. However, the room air temperature will continue to rise for some period of time as the heat of the furnace continues to enter the room through a variety of mechanisms.

This undesirably large room differential created by a bimetal coil and switch alone is corrected by the use of a so-called anticipator resistor. An anticipator resistor for heating control is connected within the thermostat circuit so as to conduct current whenever power is supplied to the furnace control. The anticipator resistor is placed in physical proximity to the bimetal coil within the thermostat housing. When power is supplied to the furnace control, the current also flowing through the anticipator resistor generates heat which raises the temperature in the vicinity of the bimetal coil, typically to a level slightly higher than that of the surrounding room air. This causes the thermostat switch to shut down the furnace before the temperature of the room air exceeds the switch differential's upper limit defined by the thermostats present temperature setting. In this way, the room differential is greatly reduced.

A further aspect of room differential relates to cycle rate. A very large room differential (or switch differential for that matter) implies a relatively low cycle rate. This stands to reason because longer warm-up and cooldown times for the heated space are implied by a larger room differential. In general, the size of the anticipator resistor is used to set the cycle rate compatible with the characteristics of the furnace.

There are two types of anticipator connections. The so-called voltage anticipator is connected in parallel with the furnace control. The value of a voltage anticipator typically runs a few thousand ohms for 24 VAC control voltage. Such an anticipator resistor can be shipped with a fixed value which will provide the desired cycle rate for any type of furnace control. The disadvantage with this type of connection is that three wires are needed to connect the thermostat into the circuit. If the thermostat is to be installed in a new structure or a structure undergoing remodeling, it is easy to run a third wire.

Where it is not easy to run a third wire, then it is usually preferred to use a conventional anticipator connection, where the anticipator resistor is placed in series with the furnace control. The disadvantage of this arrangement is that the resistor value required for the desired cycle rate varies with the current which the furnace control draws. The procedure which has been adopted is to provide as the anticipator an adjustable resistor having a scale which is calibrated with a number of different current values. At the time the thermostat is installed (or the furnace control is changed), this resistor is set to the value corresponding to the current drawn by the furnace control. By selecting the proper anticipator resistor value, accurate temperature control of the space and the proper cycle rate both result.

The preferred adjustable anticipator resistor is formed by winding small resistive wire around a form which somewhat resembles a fish's body, and hence anticipator resistors formed in this fashion are called fishtails. A small slider can be shifted to make contact with the fishtail at any turn, and in this way the resistance of the fishtail can be easily set to the appropriate value. In general the manufacturer will provide a scale which relates the slider position to the current drawn by the furnace control. In one design now commercially available from Honeywell, Inc., Minneapolis, Minn. and known as the T84 1D thermostat, letters are applied to the fishtail to designate the position of the slider, and the instructions enclosed with the thermostat relate the various letter values to the furnace control current.

In the past, it has been necessary to provide different thermostats for use with heating plants having furnaces with different preferred cycle rates. This adds the expense of stocking different thermostat models designed to provide different cycle rates.

BRIEF DESCRIPTION OF THE INVENTION

This invention is an improvement to a conventional thermostat for controlling application of power from a power source to a space temperature control device such as a furnace. Such thermostats conventionally have a temperature-sensitive element such as a bimetal coil controlling a switch having first and second terminals. The switch opens responsive to a rise above a selected temperature value in the air temperature ambient to the temperature-sensitive element and has a first terminal for connection to the first terminal of the power supply. An anticipator resistor is mounted proximate to the temperature-sensitive element and has a first terminal connected to the second terminal of the switch and a second terminal for connection to the second terminal of the power supply. A cycle rate control resistor is mounted proximate to the temperature-sensitive element and has a first terminal connected to the second terminal of the switch and a second terminal for connection to the space temperature control device. By selecting or adjusting the value of the cycle rate control resistor, the cycle rate of the space temperature control device can be set to the required value.

DESCRIPTION OF THE PREFERRED EMBODIMENT

Figure 1:
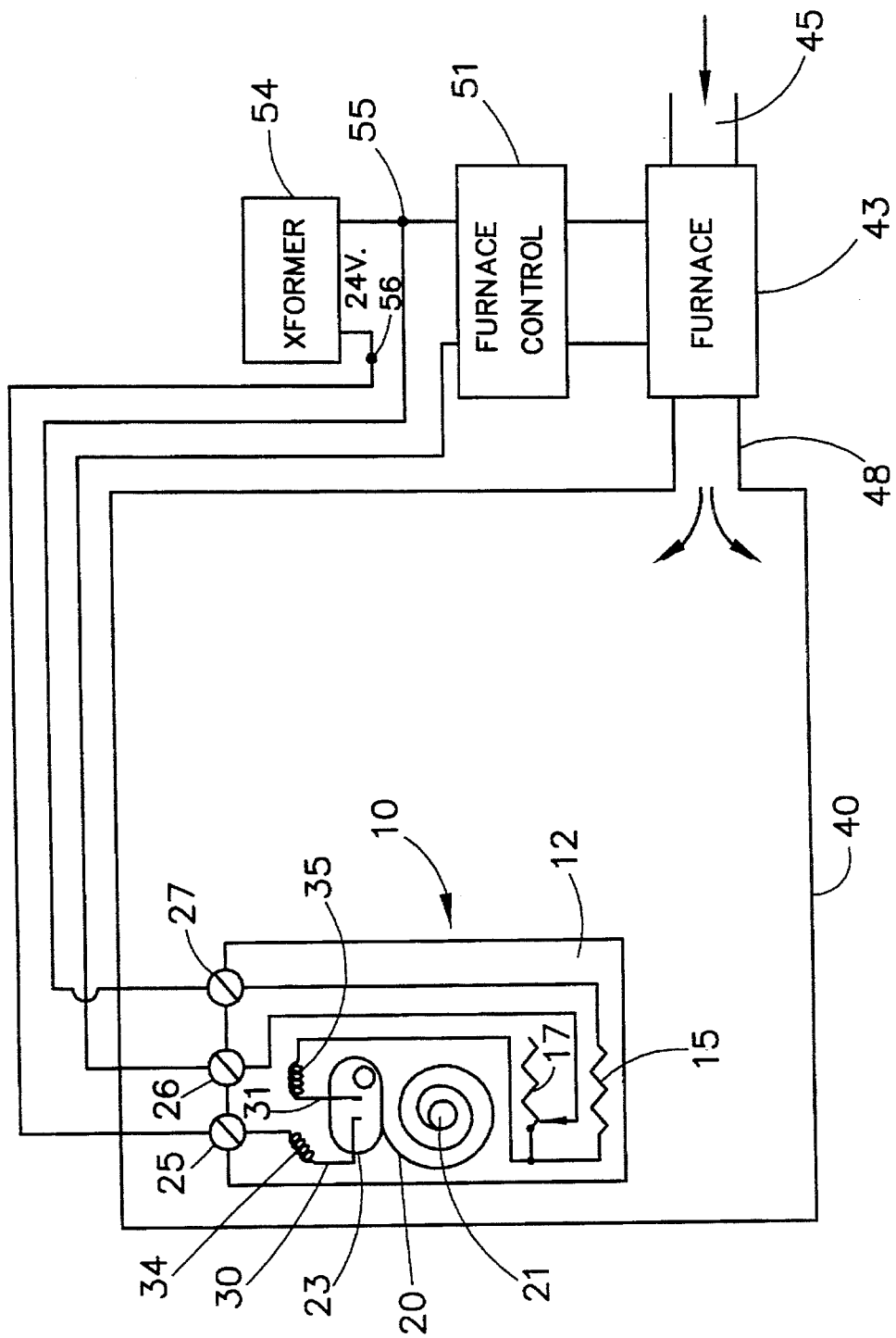
FIG. 1 shows a heating system having a thermostat whose circuit provides an adjustable cycle rate.

FIG. 1 generally shows a heating system for space within a structure 40. The heating system includes within structure 40, a thermostat 10 controlling operation of a furnace 43 by switching power from a power supply comprising a transformer 54 to a furnace control 51. In the customary arrangement, transformer 54 receives line voltage and supplies 24 VAC across terminals 55 and 56. Of course, DC supplies can also be used where the furnace control is designed to operate on DC voltage. In response to various control voltages from furnace control 51, the furnace 43 performs a totally conventional operation which includes inducing flow of cool air into an intake duct 45, heating the cool air, and expelling heated air into structure 40 through duct 48. The control voltages supplied by furnace control 51 activate the various furnace functions in a preselected sequence so as to safely and efficiently provide heated air to structure 40.

Thermostat 10 is shown as having its several components mounted on a base 12. In the typical arrangement, thermostat 10 has a cover which encloses the components, whilst also having slits or other openings therein allowing for free circulation of air throughout the interior volume of the thermostat. Again conventionally, thermostat 10 includes a bimetal coil strip 20 having an inside end mounted on a rotatable axle 21, and a mercury switch 23 for switching control power. By rotating axle 21 with a knob or lever, an occupant of space 40 can change the temperature setting of thermostat 10. Thermostat 10 has screw terminals 25–27 by which connection is made from it to transformer 54 and furnace control 51. A first contact 30 of mercury switch 23 is connected to terminal 25 by a flexible wire 34. As the temperature within space 40 drops, bimetal strip 20 unrolls slightly, lifting the right end of the bulb of mercury switch 23 relative to the left end. A mercury ball or globule within switch 23 rolls to the left, making mechanical contact between contact 30 and a second contact 31, thereby closing the circuit between contacts 30 and 31.

A first anticipator resistor 15 is connected as a voltage anticipator. A first terminal of resistor 15 is connected by a flexible conductor 35 to second switch terminal 31. A second terminal of resistor 15 is connected to screw terminal 27. A second variable anticipator resistor 17 for modifying the cycle rate of a furnace has a first terminal also connected to contact 31 by conductor 35. A second terminal of resistor 17 connected to screw terminal 26 comprises a wiper which controls the effective resistance which resistor 17 presents between contact 31 and terminal 26. Both resistors 15 and 17 are juxtaposed to bimetal strip 20 in a way allowing heat produced by current flow through them to warm the air adjacent to bimetal strip 20.

In operation, when the air temperature adjacent bimetal coil 20 cools to a temperature which causes the mercury globule within the bulb of switch 20 to roll to the left to create conduction between contacts 30 and 31, current flows to resistors 15 and 17. If the resistance of variable resistor 17 is set to zero ohms, then only resistor 15 provides heat to the air surrounding bimetal strip 20. The value of resistor 15 is preferably selected to provide a preselected cycle rate of 3 cph when the resistance of resistor 17 is set at zero ohms, but any desired cycle rate may be specified. A preferred combination of thermostat 10 inserted in or mounted on packaging for sale has the resistance of resistor 17 set to a preselected value of zero ohms, although any resistance may be chosen for the preselected value when packaged. I prefer to package thermostat 10 for delivery with resistor 17 set at zero ohms because then the installer will not have to adjust resistor 17 when the thermostat is installed in a system designed for a standardized lower preselected cycle rate. Resistor 17 is shown with this preferred initial zero ohm setting in FIG. 1.

Figure 2:
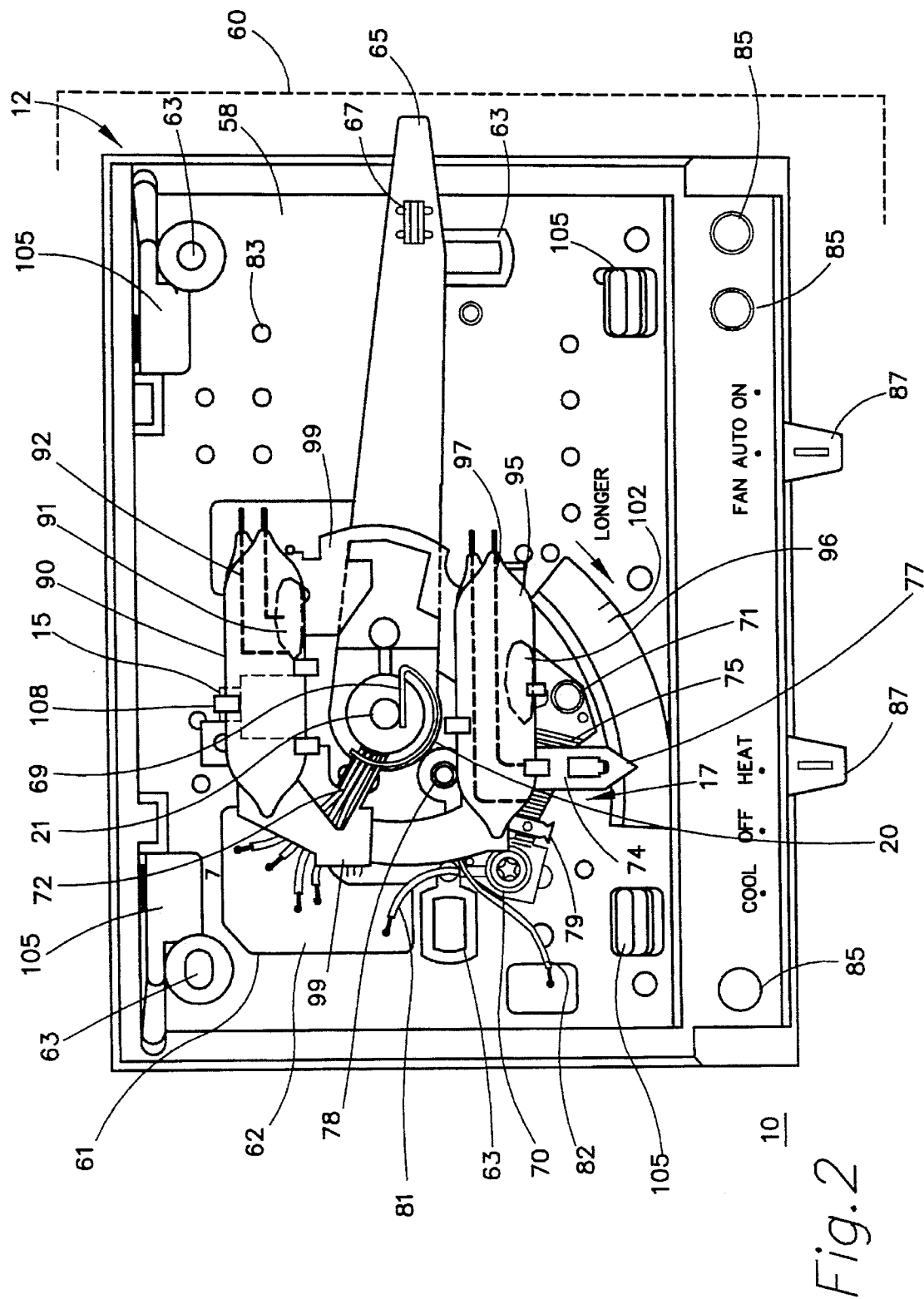
FIG. 2 is a plan view of the thermostat of FIG. 1 showing the physical location of the various components implement the functions of the thermostat and of the invention.

FIG. 2 is a plan view, actual size, of a design for a thermostat incorporating this invention. This design differs in only inconsequential ways from a commercial embodiment which is in the process of development. FIG. 2 shows the preferred placement of the thermostat 10 components shown in FIG. 1. The entire thermostat 10 is intended for placing within or mounting on packaging 60 partially shown in dotted line outline. When so mounted, the variable anticipation resistor is set to a preselected resistance for the convenience of an installer.

The base 12 is made from an insulating plastic. A part of a printed wiring board (PWB) 62 is visible through a window 61 in the face 58 of base 12. PWB 62 replicates a number of the connections shown in FIG. 1 between the various circuit elements. Holes 63 are provided for screws which attach thermostat 10 to a wall. Holes such as at 83 and elsewhere in face 58 provide test points for measuring voltages on the PWB 62 beneath. Projections 105 are for supporting a cover (not shown) which encloses the functional elements. Lever 65 is for selecting the temperature setting, and is pivotably mounted on face 58. A projection 67 carried on lever 65 indicates on a scale printed on the cover, what temperature setting is currently selected. Status LEDs are shown at 85. Levers 87 select various operating modes as indicated by the juxtaposed legends.

An axle 21 projects from and is fixedly mounted on lever 65 and rotates with lever 65 as lever 65 is moved from one temperature setting to another. The interior end 69 of bimetal coil 20 is fixed to the projecting axle 21, and by moving lever 65, the angular position of bimetal coil 20 can be adjusted. Bimetal coil 20 is only partially shown so as to avoid cluttering even more an already busy drawing, but in a typical design will have from four to five turns. The exterior end of bimetal coil 20 carries a switch bracket 99 which lies above lever 65. Glass bulbs 90 and 95 are mounted on bracket 99 by tabs as at 108. Contacts 92 within bulb 90 and contacts 97 within bulb 95 along with their respective mercury globules 91 and 96 allow switching a heating circuit as well as an air conditioning circuit. The air conditioning function of course does not involve this invention. Wires at 72 connect the external parts of the contacts 92 and 97 to PWB 62. These should be very flexible so as to avoid lending any mechanical bias to the rotation of bracket 99 during temperature changes.

The voltage anticipator resistor 15 is partially obscured by bulb 90, and is wired into the circuit as shown in FIG. 1. Resistor 15 is gripped by a tab in a copper plate (not shown) which lies beneath bracket 99 and lever 65. This copper plate extends downward to contact axle 21 on which bimetal coil 20 is mounted and to warm the air in the vicinity of bimetal coil 20. This arrangement efficiently employs both conduction and convection to transfer the heat generated by resistor 15 to bimetal coil 20.

A fishtail anticipator resistor element 75 is mounted on the face of base 12 beneath bracket 99 and partly obscured by switch bulb 95. Heat produced by resistor element 75 will warm air in its vicinity which flows upwards to warm bimetal coil 20. Resistor element 75 is mounted directly on face 58 by connection screw 70 and stud 71. Resistor element 75 is connected at its left end to PWB 62 by a jumper wire 81. A wiper assembly 74 made of spring copper or other conductive material comprises a wiper arm 79 whose end makes electrical contact with the surface of resistor element 75. Wiper assembly 74 further includes a control lever 77 integral with the wiper arm 79 and which is used to position arm 79. A stud 78 pivotably mounts wiper assembly 74 on face 58. A projecting tab on assembly 58 is connected to PWB 62 by jumper wire 82, thereby electrically connecting arm 79 to PWB 62. Wiper assembly 74 along with fishtail resistor 75 together comprise the variable anticipator resistor 17 shown in FIG. 1. Jumper wires 81 and 82 along with PWB 62 connect resistors 15 and 17 into the circuit as shown in FIG. 1. While shown as having a non-zero resistance in FIG. 2, resistor will usually be shipped with wiper assembly 74 rotated to its maximum clockwise position which places arm 79 in contact with connection screw 70 setting the resistance of resistor 17 to zero ohms.

During installation or later adjustment to set the cycle rate, the installer, by pressing on lever 77, can rotate wiper assembly 74 causing the position at which arm 79 contacts resistor 75 to change. In this way, the resistance provided between contact screw 70 and wiper arm 79 can be varied as desired by the installer. In the commercial embodiment mentioned above, resistance between jumpers 81 and 82 provided by resistor 17 can vary from zero to slightly more than 6 ohms. Of course, the zero ohm condition results from rotating wiper assembly 74 clockwise to the position when wiper arm 79 touches connection screw 70. Area 102 of face 58 provides a convenient space on which may be marked the current which the furnace control to which a thermostat is connected. By setting the lever 77 to point at a particular mark corresponding to that amperage, the cycle rate for the furnace in that installation will be increased to a preselected value accommodating a particular furnace. As mentioned above, a convenient and common cycle rate for less efficient furnaces is 5 cph. Again in our commercial embodiment, I have found that the appropriate heat output from resistor 17 to achieve a 5 cph cycle rate is about 0.16 to 0.2 W. Scale 102 can be easily calibrated for other cycle rates or with other variable resistors to provide that wattage output, using the well-known formula $P=I^2R$, where I is the current rating for furnace control 51 and R is the resistance presented between jumpers 81 and 82 by resistor 17. If the design of particular furnace should require a cycle rate different from 5 cph, it is easy to accommodate this also by simply providing a conversion table which relates actual furnace control current to that indicated on scale 102 for such a different cycle rate desired. Lastly, if the physical characteristics of a thermostat design require a different wattage output from resistor 17 to achieve the desired cycle rate, the appropriate calibration of scale 102 can be determined by empirical testing to achieve that cycle rate.

What I have found to be most convenient of all, is to ship thermostats built according to my invention with the wiper assembly rotated clockwise so that wiper arm 79 contacts connection screw 63 and the resistance of resistor 17 is zero ohms. With this setting, a thermostat can be immediately installed in a heating plant having a high efficiency furnace 43 with no adjustment of the cycling rate required. When one of these thermostats is to be installed to control a conventional furnace, only then will the installer be required to adjust such a thermostat.

The embodiments of an invention in which an exclusive property or right is claimed are defined as follows:

1. A thermostat for controlling application of power from a power supply having first and second terminals to a space temperature control device, said thermostat having a temperature-sensitive element; a switch having first and second terminals and controlled by the temperature-sensitive eleme opening responsive to a rise above a selected temperature value in the air temperature ambient to the temperature-sensitive element and having a first terminal for connection to the first terminal of the power supply; an anticipator resistor mounted proximate to the temperature-sensitive element and having a first terminal connected to the second terminal of the switch and a second terminal for connection to the second terminal of the power supply; and a cycle rate control resistor mounted proximate to the temperature-sensitive element and having a first terminal connected to the second terminal of the switch and a second terminal for connection to the space temperature control device.

2. The thermostat of claim 1, wherein the cycling modifier resistor comprises a variable resistor having a manually adjustable element.

3. The thermostat of claim 2, wherein the cycling modifier resistor is manually adjustable between first and second resistances.

4. The thermostat of claim 3, wherein the first value of the cycling modifier resistor is essentially zero ohms.

5. The thermostat of claim 4, wherein the cycling modifier resistor includes a scale relating position of the manually adjustable element to load current.

6. The thermostat of claim 5, wherein the scale for the cycling modifier resistor is calibrated to provide a preselected cycling rate when the cycling modifier resistor is set to the resistance corresponding to current rating for the load.

7. The thermostat of claim 6, wherein the preselected cycling rate is appreciably greater than three cph.

8. The thermostat of claim 6, wherein the preselected cycling rate is approximately five cph.

9. The thermostat of claim 1 in combination with packaging in which the thermostat is shipped for sale, wherein the cycling modifier resistor has a preselected first value, and wherein the thermostat, when enclosed by the packaging, has a cycling modifier resistor set to the preselected first value.

10. The combination of claim 9, wherein the preselected first value of the cycling modifier resistor is zero ohms, and wherein the anticipator resistor of the thermostat has a preselected value corresponding to a preselected cycle rate.

11. The combination of claim 10, wherein the preselected cycle rate is 3 cph.

\* \* \* \* \*

UNITED STATES PATENT AND TRADEMARK OFFICE
CERTIFICATE OF CORRECTION

PATENT NO. : 5,467,920
DATED : November 21, 1995
INVENTOR(S) : Richard B. Porter It is certified that error appears in the above-indentified patent and that said Letters Patent is hereby corrected as shown below:

Column 7, last line, cancel "eleme" and substitute --element, said switch--

Signed and Sealed this

Twenty-first Day of May, 1996

Attest:

BRUCE LEHMAN

Attesting Officer     Commissioner of Patents and Trademarks